United States Patent
Ozanam et al.

(10) Patent No.: US 11,320,730 B2
(45) Date of Patent: May 3, 2022

(54) DARK-COLOURED OR BLACK PROJECTION SCREEN

(71) Applicant: SAINT-GOBAIN GLASS FRANCE, Courbevoie (FR)

(72) Inventors: Cécile Ozanam, Massy (FR); Patrick Gayout, Villemomble (FR); Emmanuel Mimoun, Boulogne-Billancourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 283 days.

(21) Appl. No.: 16/617,345

(22) PCT Filed: Jun. 5, 2018

(86) PCT No.: PCT/FR2018/051296
§ 371 (c)(1),
(2) Date: Nov. 26, 2019

(87) PCT Pub. No.: WO2018/224766
PCT Pub. Date: Dec. 13, 2018

(65) Prior Publication Data
US 2021/0132485 A1 May 6, 2021

(30) Foreign Application Priority Data
Jun. 7, 2017 (FR) ..................................... 1755047

(51) Int. Cl.
G03B 21/62 (2014.01)
G03B 21/28 (2006.01)
(Continued)

(52) U.S. Cl.
CPC ............. *G03B 21/62* (2013.01); *G03B 21/28* (2013.01); *G03B 21/56* (2013.01); *G03B 21/58* (2013.01); *G03B 21/60* (2013.01); *G03B 21/625* (2013.01)

(58) Field of Classification Search
CPC ........ G03B 21/56; G03B 21/60; G03B 21/58; G03B 21/625; G03B 21/62; G03B 21/28
(Continued)

(56) References Cited

U.S. PATENT DOCUMENTS 9,176,370 B1 * 11/2015 Norton ..................... G02B 5/02
10,513,097 B2 * 12/2019 Suzuki ................... G02B 6/005
(Continued)

FOREIGN PATENT DOCUMENTS

FR     2 971 060 A1     8/2012
FR     2971060   *   8/2012 ............. B32B 17/06
(Continued)

OTHER PUBLICATIONS

International Search Report as issued in International Patent Application No. PCT/FR2018/051296, dated Oct. 23, 2018.

*Primary Examiner* — Clayton E. LaBalle
*Assistant Examiner* — Kevin C Butler
(74) *Attorney, Agent, or Firm* — Pillsbury Winthrop Shaw Pittman LLP

(57) ABSTRACT

An article used as black or dark-colored front-projection screen includes two distinct diffusely reflecting scattering elements, taking the form of parallel sheets or planes, qualified first and second scattering elements, wherein the first scattering element is translucent or transparent and the second scattering element is of dark color.

18 Claims, 3 Drawing Sheets

Figure 1A:
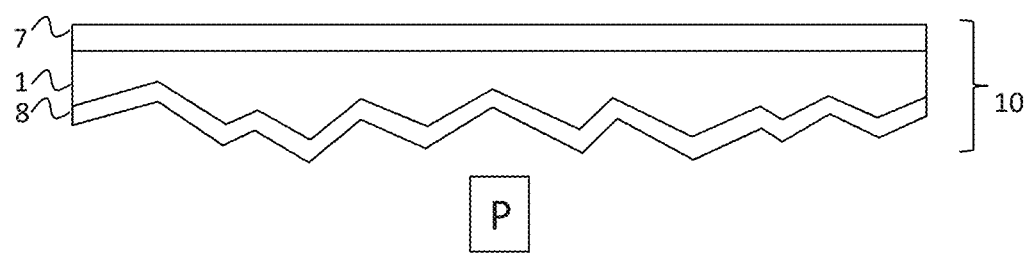

(51) Int. Cl.
*G03B 21/58* (2014.01)
*G03B 21/625* (2014.01)
*G03B 21/60* (2014.01)
*G03B 21/56* (2006.01)

(58) Field of Classification Search
USPC .................................................. 359/443
See application file for complete search history.

(56) References Cited

U.S. PATENT DOCUMENTS

| | | | | |
|---|---|---|---|---|
| 2006/0012876 | A1* | 1/2006 | Choi | G03B 21/625 359/452 |
| 2008/0030882 | A1* | 2/2008 | Ichikawa | G03B 21/60 359/839 |
| 2008/0239216 | A1* | 10/2008 | Miyamoto | B42D 25/373 349/113 |
| 2009/0097123 | A1* | 4/2009 | LaFleur | G02B 3/0043 359/599 |
| 2009/0218028 | A1* | 9/2009 | Wang | G01N 21/658 156/60 |
| 2009/0231714 | A1* | 9/2009 | Zhao | C09D 5/006 359/601 |
| 2011/0041726 | A1* | 2/2011 | Robb | C09D 7/68 106/31.13 |
| 2011/0209752 | A1* | 9/2011 | Kohnke | H01L 31/0392 136/256 |
| 2011/0209753 | A1* | 9/2011 | Kohnke | C03C 17/007 136/256 |
| 2011/0290314 | A1* | 12/2011 | Kobyakov | H01L 31/03921 136/256 |
| 2012/0280368 | A1* | 11/2012 | Garner | H01L 51/0097 257/629 |
| 2015/0014603 | A1* | 1/2015 | Yoshihara | B29C 45/0046 252/511 |
| 2015/0114552 | A1* | 4/2015 | Cernohous | B29C 43/24 156/242 |
| 2015/0322270 | A1* | 11/2015 | Amin | G02B 1/115 428/141 |
| 2015/0343833 | A1* | 12/2015 | Van De Broek | B43L 1/00 434/408 |
| 2016/0231614 | A1* | 8/2016 | Mitsui | G02B 5/0236 |
| 2019/0079380 | A1* | 3/2019 | Yanai | G03B 21/604 |
| 2019/0107653 | A1* | 4/2019 | Tao | G03B 21/56 |
| 2019/0302603 | A1* | 10/2019 | Yanai | B32B 27/08 |

FOREIGN PATENT DOCUMENTS

| | | | | |
|---|---|---|---|---|
| GB | 2 512 824 A | | 10/2014 | |
| WO | WO 2004/036310 A1 | | 4/2004 | |
| WO | WO-2004036310 A1 | * | 4/2004 | .......... G03B 21/625 |
| WO | WO 2011/012913 A1 | | 2/2011 | |
| WO | WO 2012/104547 A1 | | 8/2012 | |
| WO | WO 2013/175129 A1 | | 11/2013 | |
| WO | WO 2016/035227 A1 | | 3/2016 | |

* cited by examiner

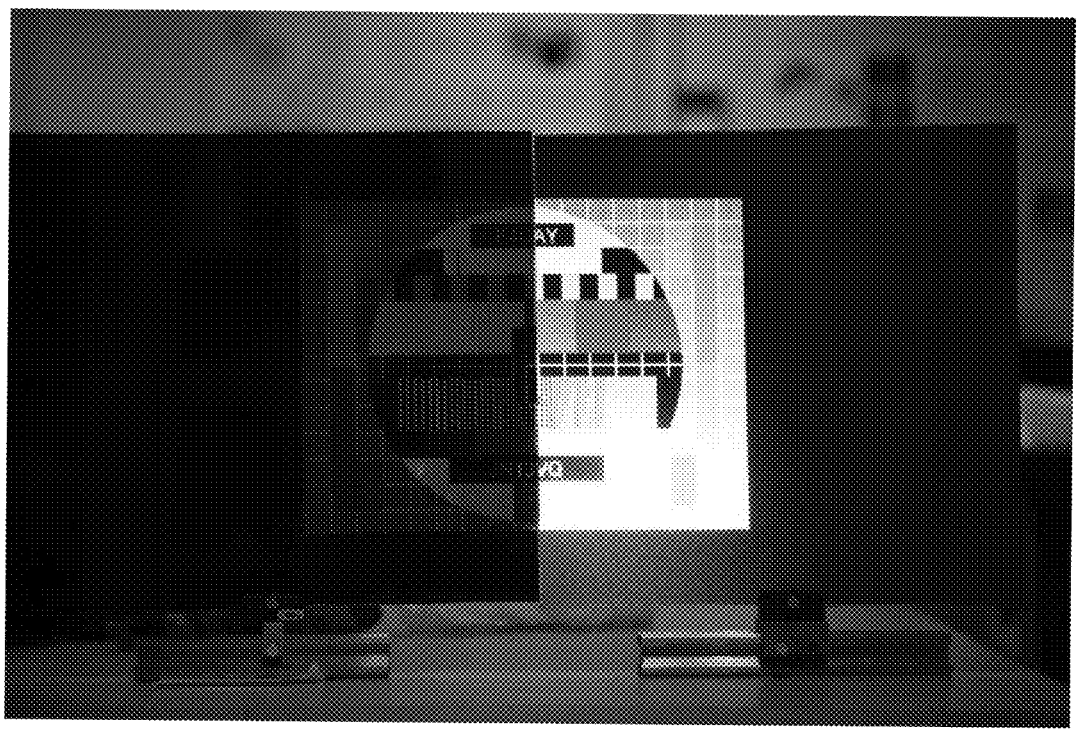
Fig. 3G Fig. 3D
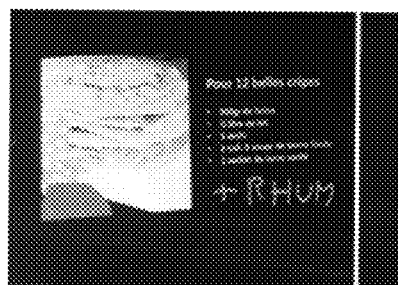 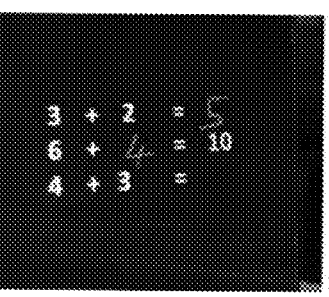 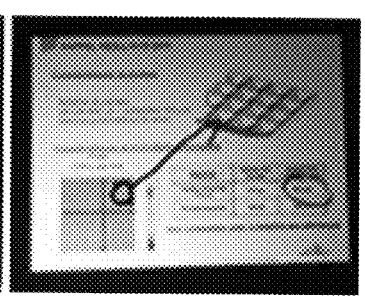
Fig. 4B Fig. 4C Fig. 4D

DARK-COLOURED OR BLACK PROJECTION SCREEN

CROSS-REFERENCE TO RELATED APPLICATIONS

This application is the U.S. National Stage of PCT/FR2018/051296, filed Jun. 5, 2018, which in turn claims priority to French patent application number 1755047 filed Jun. 7, 2017. The content of these applications are incorporated herein by reference in their entireties.

The invention relates to a black or dark-colored article able to be used as a front-projection screen operating in reflection. The invention also relates to a front-projection system and to a front-projection method using said article.

A front-projection screen allows an image to be viewed on a face of the screen. The image is output by a projector or more generally a light source, positioned facing said face of the screen. In the case of front projection, as opposed to rear projection, the face onto which is projected the image originating from the light source is positioned in the same region of space as the light source.

In order for an article to be able to be used as a front-projection screen, it is necessary for it to reflect light diffusely. Usually, the reflection by an article is said to be diffuse when radiation incident with a given angle of incidence is reflected by the article in a plurality of directions. In contrast, the reflection by an article is said to be specular when radiation incident with a given angle of incidence is reflected by the article with an angle of reflection equal to the angle of incidence. Analogously, transmission through an article is said to be specular when radiation incident with a given angle of incidence is transmitted by the article with an angle of transmission equal to the angle of incidence.

At the present time, there is a high demand for black or dark-colored front-projection screens. However, black or dark media in general form poor front-projection screens because they reflect light little. The intensity of the front-projected images is low. The white luminance of an image projected onto a black medium is too low to obtain a satisfactory contrast.

Measurements of black and white luminance allow the quality of an article used as front-projection screen to be evaluated. Luminance corresponds to the light intensity per unit area projected orthogonally onto a plane normal to the direction in question (which is expressed in $cd/m^2$). This parameter corresponds to the visual sensation of brightness, caused by the reflection or emission of light by a surface.

In the present patent application, the luminance values are measured with a Konica-Minolta® LS-110 luminance meter. The projection image is produced with a Canon® XEED SX80 video projector (brightness 3000 lm, contrast 900:1). The arrangement of the elements is the following. The video projector is located facing and at 1.5 m from the article used as screen. The projection direction is normal to the screen. The observers, the luminance meter and optionally the camera are located at 2 m from the article.

Certain articles used as screen may comprise a first planar surface located between the projector and the first scattering element. This planar surface may give rise to specular reflection. In the context of the present patent application, when luminance is measured, specular reflection, which is of no interest to the targeted application, is systematically excluded. Therefore, when the luminance must be measured in a direction coincident with the direction of specular reflection, the luminance measurements are carried out with an angular variation of 3° with respect to the direction of specular reflection, in order to exclude this specular reflection.

The direction of specular reflection is defined by the projection direction and the normal to the screen. In the configuration described above, the projection direction is aligned with the normal to the screen. The direction of specular reflection is therefore also the normal to the screen.

Unless otherwise indicated, the luminance measurements are taken in an environment illuminated to 350 LUX with an angle of 3° with respect to the direction of the specular reflection corresponding to the normal to the screen in order to exclude the specular reflection.

Decorative lacquered glasses sold, for example, by Saint-Gobain under the trade names Planilaque®, Decolaque® or Feeling®, are known. These glazings consist of a glass substrate, to the back face of which an opaque coating corresponding to a lacquer is applied. According to the invention, the term "lacquer" is understood to mean a colored, black or white opaque coating. Black lacquered glasses of this type in particular have a black luminance lower than 5 $cd/m^2$ and a white luminance lower than 30 $cd/m^2$, in particular of about 20 $cd/m^2$ in an environment illuminated to 350 LUX measured with an angle of 3° with respect to the direction of specular reflection on the front face.

Lacquered glasses of dark color are unsatisfactory when used as front-projection screens. For the reasons mentioned above, the optical properties of these dark lacquered glasses are not compatible with the projection of images.

In addition, these dark-colored lacquered glasses, and particularly black lacquered substrates, have the drawback of making finger marks and smudges extremely visible.

Patent applications WO 2012/104547 and WO 2013/175129 disclose transparent glazings comprising specularly transmitting and diffusely reflecting layered elements used as front-projection screens. A specularly transmitting and diffusely reflecting layered element is an element that gives rise to specular transmission and to diffuse reflection of radiation incident on the element. The objective targeted in these patent applications is to preserve transparency in order to guarantee clear vision through the glazing. Glazings of this type have a black luminance between 5 and 17 $cd/m^2$ and a white luminance between 300 and 2300 $cd/m^2$ in an environment illuminated to 350 LUX measured with an angle of 3° with respect to the direction of specular reflection.

There is a need to develop a black or dark-colored article allowing images of good quality to be projected with a good brightness and a good contrast.

The invention relates to an article used as front-projection screen comprising two distinct diffusely reflecting scattering elements, taking the form of parallel sheets or planes, qualified first and second scattering elements, characterized in that:

the first scattering element is translucent or transparent and the second scattering element is of dark color.

According to the invention, the scattering elements in sheet or plane form are elements comprising two main surfaces separated by edges. The term "scattering element" encompasses substrates but also films and layers, even very thin films and layers that are not self-supporting and require a carrier substrate.

According to the invention, the scattering elements in sheet or plane form are impermeable or seal-tight, i.e. they prevent the penetration of a fluid, and in particular of air.

According to one preferred embodiment, the first scattering element comprises a textured surface. In this embodiment, it is the surface texture that causes the scattering. The rough surface therefore corresponds to a scattering plane. In this case, the scattering element takes the form of a plane.

According to the invention, a "translucent" element is an element that transmits light diffusely and a "transparent" element is an element that transmits light specularly. The first scattering element has a light transmission higher than 30%, or even 50% and a light reflection higher than 4%.

According to the invention, the expression "diffusely reflecting scattering element" is understood to mean an element that reflects light in every direction. When the reflection is almost homogenous in every direction, the reflection is considered to be uniform. In the ideal case, Lambertian reflection is spoken of. When the light is scattered in every direction with a privileged direction for which the reflection is higher, the reflection is considered to be non-Lambertian or nonuniform.

Measurements of black and white luminance at various angles of observation make it possible to evaluate whether the scattering by a surface is uniform or nonuniform.

According to the invention, the diffuse reflection or scattering is considered to be uniform if the maximum variations in normalized gain as a function of angle of observation, in absolute value, measured between 0° and 60° with respect to the normal to the screen, are smaller than 0.15, or even smaller than 0.10, and preferably smaller than 0.05.

According to the invention, the diffuse reflection or scattering is considered to be nonuniform if the maximum variations in normalized gain as a function of angle of observation, measured between 0° and 60° with respect to the normal to the screen are:

in absolute value, larger than 0.2, or even larger than 0.5, or even larger than 1, or even larger than 5, and in percent, larger than 30%, or even larger than 50%, preferably larger than 80%, or even larger than 90%.

Normalized gain is determined in the following way:
$G=(Lbx°-Lnx°)/(Lbrefx°-Lnrefx°)$ with
$Lbx°$: White luminance,
$Lnx°$: Black luminance,
$Lbrefx°$: White luminance of a reference Lambertian diffuser,
$Lnrefx°$: Black luminance of a reference Lambertian diffuser.

These luminance values are all measured at the same angles of observation corresponding to x° with respect to the normal to the screen.

An ideal or Lambertian diffuser is perfectly reflective at any point on its surface and possesses a constant gain whatever the angle of observation.

The maximum variation in normalized gain is determined in the following way:
in absolute value: $\Delta G=|G_{max}-G_{min}|$,
in percent: $\Delta G=|G_{max}-G_{min}|/G_{max}*100$,
with
$G_{max}$: Maximum normalized gain measured between 0 and 60° with respect to the normal to the screen,
$G_{min}$: Maximum normalized gain between 0 and 60° with respect to the normal to the screen.

Preferably, the first scattering element has a nonuniform diffuse reflection, i.e. it does not reflect radiation uniformly in every direction. The second scattering element has a uniform diffuse reflection, i.e. it reflects radiation uniformly in every direction.

When the article is used as front-projection screen, the images are projected from the side of the first scattering element. The image therefore forms on the reflective "surface" of the first scattering element.

When the first scattering element has a nonuniform diffuse reflection, the article incorporating it also has a nonuniform diffuse reflection measured on the side of this first scattering element.

Advantageously, the article has maximum variations in normalized gain as a function of angle of observation, measured on the side of the first scattering element, between 0° and 60° with respect to the normal to the screen that are:

in absolute value, larger than 0.2, or even larger than 0.5, or even larger than 1, or even larger than 5, and in percent, larger than 30%, or even larger than 50%, preferably larger than 80%, or even larger than 90%.

This means that the luminance values, in particular the white luminance, vary depending on the angle of observation. This also means that there is a direction in which the diffuse reflection is maximum. This direction is qualified the privileged scattering direction.

According to certain embodiments, the article may comprise a first planar surface located between the projector and the first scattering element. This planar surface may give rise to specular reflection. This specular reflection must be excluded in order to determine the privileged scattering direction. When the privileged scattering direction is coincident with the direction of specular reflection, the luminance measurements are carried out with an angular variation of 3° in order to exclude this specular reflection.

The privileged scattering direction may be determined either by the luminance measurements excluding specular reflection.

The privileged scattering direction may also advantageously be determined by virtue of the diffuse reflection profile resulting from the measurement of the BRDF (bidirectional reflectance distribution function). This measurement allows the specular reflection and diffuse reflection to be isolated. The BRDF allows the intensity of the light scattered by a surface when the latter is illuminated to be characterized. The BRDF gives the amount of light scattered as a function of the direction of observation, of the angle of incidence of the light, of wavelength and of polarization.

The diffuse reflection of the article, measured on the side of the first scattering element, may be maximum in the direction of specular reflection. In this case, the article when used as a screen reflects more light at small angles than at large angles.

The diffuse light reflection of the first scattering element or of the article, measured on the side of the first scattering element, may also have a least one maximum in a direction distinct from the direction of specular reflection. The angle of maximum scattering is in this case different from the angle of specular scattering.

The luminance values in the privileged scattering direction, the specular being excluded, are measured according to the following criteria:
measurement in the privileged scattering direction when the privileged scattering direction and the direction of specular reflection are not coincident or
measurement in the privileged scattering direction corrected by 3° when the privileged scattering direction and the direction of specular reflection are coincident.

When the optical characteristics such as light transmission TL, light reflection RL, luminance, and the coordinates L*, a*, b* are measured for the article "on the side of the first element" this means that these measurements are carried out with radiation at normal incidence (unless otherwise indicated) that passes through the article so as to meet the first scattering element first and then the second scattering element. The side of the first scattering element corresponds to the face of the article separated from the second scattering element by the first scattering element.

The synergistic interaction between the black or dark-colored scattering element and the translucent or transparent scattering element allows a front-projected image with an excellent brightness and an excellent contrast to be obtained while preserving, for the article, a black or dark-colored visual appearance.

The solution of the invention in particular allows high white-luminance values, in particular values higher than 100 cd/m², or even higher than 1000 cd/m², and black-luminance values lower than 30 cd/m², these values being measured in the privileged scattering direction, the specular being excluded, to be obtained. The white-luminance values are in particular as high as those obtained with a white lacquered glass substrate. The black-luminance values remain extremely low. The article according to the invention therefore has the advantageous property of a low black luminance without the drawback of the low white luminance of black lacquered glasses.

The invention provides an article that is usable as a front-projection screen and that achieves:
   a white luminance that is sufficiently high to allow good viewing of projected images,
   projected images of good resolution,
   a very good rendering of colors.

Another considerable advantage of the article according to the invention relates to the reduction of the visibility of marks and smudges. Surprisingly, although the article is black or of dark color, the visibility of marks and smudges, such as finger marks, is substantially decreased, in particular when it is illuminated. If an article according to the invention comprising a translucent or transparent first scattering element and a black or dark-colored second scattering element is compared with an article solely comprising a black or dark-colored scattering element, for example a black lacquered substrate comprising two smooth main faces, the contrast measured on a finger mark is indeed lower with the article according to the invention than with the other article corresponding to the black lacquered substrate alone.

The article according to the invention also has all the features required for it to be used as a dry-erase board, such as a blackboard.

The dark color of the article observed from the side of the first scattering element corresponds to the perception of the dark color of the second scattering element seen through the first scattering element.

The second scattering element of dark color has a black luminance, in order of increasing preference, lower than 30 cd/m², preferably lower than 20 cd/m², or lower than 10 cd/m².

The second scattering element has a uniform reflective surface. The normalized gain does not vary as a function of angle of observation.

In contrast, in so far as the first scattering element preferably has a nonuniform reflection, the luminance values of the article measured on the side of the first scattering element are not the same depending on angle of observation.

The article has a black luminance, in order of increasing preference, lower than 30 cd/m², lower than 20 cd/m², lower than 10 cd/m², or lower than 8 cd/m², measured in an environment illuminated to 350 LUX in the privileged scattering direction, the specular being excluded, on the side of the first scattering element.

The article has a white luminance, in order of increasing preference, higher than 50 cd/m², higher than 60 cd/m², higher than 80 cd/m², higher than 100 cd/m², higher than 200 cd/m², higher than 500 cd/m², or higher than 1000 cd/m², measured in an environment illuminated to 350 LUX in the privileged scattering direction, the specular being excluded, on the side of the first scattering element.

Contrast corresponds to the ratio of the white luminance to the black luminance. The luminance values are measured as explained above, in the privileged scattering direction, plus or minus 3° in order to potentially exclude specular reflection.

Preferably, the article according to the invention has a contrast, in order of increasing preference, higher than 30, higher than 50, higher than 60, higher than 80, higher than 100, or higher than 200.

Color may also be evaluated by virtue of the color coordinates $L^*$, $a^*$ and $b^*$ calculated under illuminant D65 and with the CIE-1931 reference observer. The component $L^*$ defines lightness, which ranges from the value 0 for black to the value 100 for white. According to the invention, what is meant by "dark color" or "dark-colored" is an element having a lightness such that the value $L^*$ measured in reflection is lower than 50.

The dark-colored second scattering element has a lightness such that the value $L^*$ measured in reflection is, in order of increasing preference, lower than 50, lower than 40, lower than 35, or lower than 30.

The article has a lightness such that the value $L^*$ measured in reflection on the side of the first scattering element is, in order of increasing preference, lower than 60, lower than 50, lower than 45, lower than 40, lower than 35, or lower than 30.

According to the embodiment in which the diffuse reflection of the first scattering element is nonuniform, it is possible to modulate the preferential scattering angle. For example, when the scattering element is an element having a textured surface, it is possible to define a preferential scattering angle by modifying the distribution of the slopes of the features of the textured surface. According to this embodiment, the diffuse reflection is defined by a plurality of reflection directions that is centered on at least one preferential direction that may be distinct from the direction of specular reflection. Thus, the or each best angle of observation for the observer, i.e. the angle of observation allowing him to observe a projected image with a maximum brightness, is disassociated from the direction of specular reflection. The risk of glare due to specular reflection is therefore decreased or even avoided. Advantageously, in situations in which the viewing angle is small, it is possible to concentrate the radiation reflected diffusely by the scattering element in privileged directions, by selecting a suitable texture for the textured surface of the scattering element.

The invention therefore also provides an article that is usable as a front-projection screen having adjustable viewing angles, compatible with a large number of existing front-projection situations.

The article according to the invention may have a viewing angle ranging from 20° to 180°. According to the invention, the viewing angle corresponds to 2 times the angle of observation for which the contrast passes below 4.5.

Preferably, the second scattering element is a scattering coating. The scattering coating is black or of dark color. The scattering coating may be deposited on an additional substrate. The additional substrate and the first scattering element are securely fastened by lamination using a sheet made of plastic material.

In certain advantageous embodiments, the black or dark-colored scattering coating is absorbent and/or opaque. The rays transmitted through the first scattering element may mainly be absorbed by the black or dark-colored coating. Thus, problems with ghost images are to a large part avoided by preventing or attenuating the formation of these ghost images. This opaque coating participates in the obtainment of a better definition of the projected image.

The first and the second scattering element are located in contact, preferably in direct contact, with each other. According to the invention, the term "in contact" means that the two elements are not separated from each other by a layer of air or of gas. In contrast, "in contact" does not mean that the two elements make direct contact with each other.

The article according to the invention has a light transmission, in order of increasing preference, lower than 25%, lower than 20%, lower than 15%, lower than 10%, lower than 5%, lower than 1%, or of 0%.

The article according to the invention has, in order of increasing preference, a light reflection, measured on the side of the first scattering element, higher than 1%, higher than 4%, higher than 5%, higher than 10%, higher than 20%, or higher than 30%.

The article according to the invention appears black or dark color when it is observed from the side of the first scattering element. The presence of the translucent or transparent first scattering element makes it possible to see through the black or dark-colored second scattering element. However, the visual aspect of the article does not correspond exactly to the visual aspect of the black or dark-colored second scattering element. The presence of the first scattering element partially modifies the visual appearance of the black or dark-colored second scattering element. It in particular gives it a metallic appearance or metallic effect that is more or less marked depending on angle of observation. Such metallic effects are sought after for aesthetic reasons. The article according to the invention therefore advantageously has a metallic effect.

The first scattering element comprises at least one textured surface. This first scattering element may be chosen from a textured substrate or a specularly transmitting and diffusely reflecting transparent layered element. In each of these cases, it is the presence of a textured surface that is the origin of the diffuse reflection.

The textured substrate may comprise a reflective layer deposited on the textured surface. This reflective layer may be deposited conformally on the textured surface or in such a way that the texture profile, in particular the slope distribution, remains such as defined below. The reflective layer may correspond exactly to the central layer defined below and in particular comprise a single layer or a stack of layers.

A specularly transmitting and diffusely reflecting transparent layered element comprises:
two transparent external layers (2, 4) having substantially the same refractive index (n2, n4) and each having a smooth external main surface (2A, 4A), and
a central layer (3) intermediate between the external layers (2, 4), the central layer (3) comprising at least one transparent layer of refractive index (n3) different from that of the external layers or a metal layer,
all the contact surfaces ($S_0, S_1, \ldots, S_k$) between two adjacent layers of the layered element (1), one of the two layers of which is a metal layer, or that are two transparent layers of different refractive indices, being textured and parallel to one another.

An external layer of the layered element may be formed by a textured substrate chosen from polymers, glasses or ceramics comprising at least one textured surface.

The central layer of the layered element may be obtained by depositing, by cathode sputtering, a single layer or a stack of layers.

In the rest of this description, reference is made to the slopes of the texture of the textured surface of the scattering element. It may in particular be a question of the slopes of the texture of the textured surface of the textured substrate or of each textured contact surface of the layered element that is located between two adjacent layers one of which is a transparent, in particular dielectric, layer, and the other of which is a metal layer, or between two adjacent layers that are two transparent, in particular dielectric, layers of different refractive indices. In so far as all the textured contact surfaces of the layered element are parallel to one another, there is a single textured profile and a single slope distribution valid for all these textured contact surfaces.

The diffuse-reflection properties of the scattering element depend on the texture profile of the textured surface. The aspect of the indicatrix of diffusion of the article in reflection is dependent on the nature of the texture and in particular the slope distribution. By modifying the form of this indicatrix of diffusion in reflection it is possible:
to obtain intermediate states between specular reflection and perfectly diffuse or "ideal" reflection, in which the light may be dispersed narrowly or widely,
to obtain a diffuse reflection that is centered on at least one preferential direction that may be distinct from the direction of specular reflection.

According to one aspect of the invention, the texture of the textured surface of the textured substrate or of each contact surface between two adjacent layers one of which is a transparent, in particular dielectric, layer and the other of which is a metal layer, or that are two transparent, in particular dielectric, layers of different refractive indices, is formed by a plurality of features that are recessed or that protrude with respect to a general plane of the contact surface.

Scattering elements comprising a textured surface the slope distribution of which has the characteristics described below backscatter sufficiently for an image to be formed in direct projection. These scattering elements are capable:
of generating a maximum diffuse reflection that is more or less strong in the direction of specular reflection,
of generating a maximum diffuse reflection in a direction distinct from the direction of specular reflection.

The root-mean-square slope Rdq of the profile of the textured surface, in particular of the textured substrate or of each contact surface, is strictly higher than 0.2°. Preferably, the root-mean-square slope Rdq of the profile of the textured surface is, in order of increasing preference, comprised between 0.5° and 40°, between 1.0 and 30°, between 2° and 20°, or between 2° and 10°. Preferably, the root-mean-square slope Rdq of a smooth surface is lower than 0.2°. In the context of this patent application, the root-mean-square slope Rdq of a surface is such as defined in standard ISO 4287 and measured using a MICROMESURE 2 profilometer from the company STIL, in an area of 1 mm×1 mm with a sampling pitch of 1 μm×1 μm.

The roughness measurements may be carried out using the MICROMESURE 2 profilometer from the company STIL under the following conditions. The measurement head consists of a chromatic lens associated with a "magnifier" having the following features: numerical aperture of 0.42; maximum measurement angle of 25°; resolution in Z of 0.04 microns; lateral resolution of 4.5 microns. The roughness parameter that is the root-mean-square slope Rdq is extracted with a low-pass Gaussian filter having a cut-off length of 19 microns (which filters microroughness) and a high-pass Gaussian filter having a cut-off length of 1 mm (which filters undulations).

In addition, the choice of the texture also allows the visual appearance or visual perception of the article, in particular its color, the intensity of its color and the presence of metallic effects, to be modified. The choice of the texture may also allow a different visual appearance to be obtained depending on viewing angle.

For example, two articles according to the invention differ solely in the choice of the first scattering element. The first article comprises a first scattering element the diffuse reflection of which is almost uniform and the second article comprises a first scattering element the diffuse reflection of which is nonuniform with a maximum centered on 0°. The two articles comprise the same black opaque uniformly scattering second scattering element. Seen face-on, the first article appears darker than the second article. The color of the first article appears uniform whatever the viewing angle. In contrast, the color of the second article at large angles of observation appears darker than at perpendicular and darker than the first article.

Independently of the texture, the brightness of the observed image depends on the nature of the central layer or potentially of the reflective layer. It is possible to adapt its optical properties, in particular its reflective properties, by modifying the choice of the materials and of the thicknesses.

The second scattering element may be a black or dark-colored scattering coating, in particular an opaque and absorbent coating chosen from mineral or organic paints and enamels.

The paint mainly comprises the mixture:
of an organic resin or of a mineral binder and
of organic or inorganic pigments.

The enamel is obtained from glass frit, from inorganic pigments and from a resin that disappears when heated.

The black or dark-colored scattering coating according to the invention has a sufficient thickness for the light transmission of a substrate coated with such a coating to be lower than 1%.

By way of example, the black or dark-colored scattering coating may have a thickness larger than 10 μm or comprised between 10 μm and 500 μm, or even between 20 and 100 μm.

According to the invention, a black or dark-colored scattering coating has a lightness such that the value L* measured in reflection is, in order of increasing preference, lower than 60, lower than 50, lower than 40, lower than 35, or lower than 30.

When the optical characteristics such as TL, RL, L*, a* and b* are measured on the scattering coating alone, these measurements are taken with radiation at normal incidence on the side of the face of the scattering coating intended to be seen. This face therefore corresponds to the face that will be visible through the layered element once it has been positioned in the article.

According to a second embodiment, the first scattering element is a layered element and the second scattering element is a scattering coating. The layered element and the scattering coating may be assembled by any known means.

The scattering coating may be deposited directly on one of the smooth external main surfaces of the layered element.

The scattering coating may also be deposited on an additional substrate; the additional substrate and the first scattering element are securely fastened by lamination using a sheet made of plastic material. In this case, the scattering coating is deposited on the face of the additional substrate that is:
furthest from the transparent layered element or
closest to the transparent layered element.

Advantageously, the sheet made of plastic material may be an external layer of the layered element.

When the substrate comprising the black or dark-colored scattering coating is laminated on the side of the scattering coating, the risk of seeing a ghost image appear by reflection of some of the incident light by the scattering coating is decreased, in particular when the screen is observed with a large angle (grazing angle).

However, in this embodiment, it may be advantageous to improve the adhesion between the layered element and the scattering coating. To this end, it is possible:
to use a sheet made of plastic material made of EVA and/or
to apply a colorless tie layer (adhesion primer) to the black or dark-colored scattering coating.

An article according to the invention comprises in this order:
a first scattering element comprising a layered element comprising:
an external layer chosen from transparent textured substrates, preferably made of rough glass,
a central layer deposited by cathode sputtering,
an external layer chosen from a sheet made of thermoformable or pressure-sensitive plastic material,
a second scattering element comprising a scattering coating deposited on an additional substrate.

The layered element may also be a laminated textured film. The textured film comprises a layer deposited by magnetron sputtering deposited on the textured surface. In this case, an article according to the invention comprises in this order:
a first scattering element comprising a laminated textured film,
a second scattering element comprising a scattering coating, optionally deposited on an additional substrate.

Another subject of the invention is the article used as front-projection screen operating in reflection. In this case, the article comprises a front face onto which is projected the image and a back face. The second scattering element is separated from the front face a least by the first scattering element.

A front-projection screen operating in reflection means that the spectators and the projector are located on the same side of the article.

Another subject of the invention is a front-projection system comprising an article according to the invention used as front-projection screen and a projector, the article comprising a front face onto which is projected the image and a back face characterized in that the second scattering element is separated from the front face at least by the first scattering element.

Another subject of the invention is a reflective front-projection method in which a front-projection screen operating in reflection and a projector are provided, said method consisting in projecting, by virtue of the projector, images onto the front-projection screen, said front-projection screen comprising an article according to the invention.

Unless specifically specified otherwise, the expressions "deposited on" do not necessarily mean that two elements, layers, coatings and/or systems are placed in contact with each other.

The black or dark-colored article according to the invention is most particularly suitable for use as a front-projection screen in meeting rooms or classrooms. The article may also be used in a kitchen worktop.

In any case, it is easy to combine the projection-screen functionality and a blackboard functionality. Specifically, it is possible to write on the article, just as on any glass substrate, with suitable markers, in particular whiteboard markers or markers based on easily removable liquid chalks.

The part below describes the layered element in more detail.

By dielectric layer or material what is meant is a layer or material of low electrical conductivity, lower than 100 S/m.

A dielectric layer or material is a layer or material that is non-metal. A dielectric material may be of mineral or organic nature. Mineral dielectric layers or materials may be chosen from oxides, nitrides or halides of one or more transition metals, nonmetals or alkaline-earth metals. The transition metals, nonmetals or alkaline-earth metals are preferably chosen from silicon, titanium, tin, zinc, indium, aluminum, molybdenum, niobium, zirconium, and magnesium. Organic dielectric layers or materials are chosen from the polymers.

Each external layer of the layered element may be formed by a stack of layers, provided that the various constituent layers of the external layer are made of transparent, in particular dielectric, materials all having substantially the same refractive index.

The central layer of the layered element may be formed by a single layer that is a transparent, in particular dielectric, layer of refractive index different from that of the external layers or a metal layer. As a variant, the central layer of the layered element may be formed by a stack of layers that comprises at least one transparent, in particular dielectric, layer of different refractive index from that of the external layers or a metal layer.

With respect to the layered element, there is a difference between:
on the one hand, metal layers, for which the value of the refractive index is unimportant, and
on the other hand, transparent, in particular dielectric, layers, for which the refractive index difference with respect to that of the external layers needs to be taken into consideration.

Advantageously, to obtain the specularly transmissive and diffusely reflective properties of the layered element, all the contact surfaces between two adjacent layers of the layered element, one of which is a transparent, in particular dielectric, layer and the other of which is a metal layer, or that are two transparent, in particular dielectric, layers of different refractive indices, are textured and parallel to one another.

The diffuse reflection from each side of the layered element is due to the fact that each contact surface between two adjacent layers of the layered element one of which is a transparent, in particular dielectric, layer and the other of which is a metal layer, or that are two transparent, in particular dielectric, layers of different refractive indices, is textured. Thus, when radiation incident on the layered element, from either side thereof, reaches such a contact surface, it is reflected by the metal layer or because of the refractive-index difference between the two transparent layers and, as the contact surface is textured, the reflection is diffuse.

The specular transmission through the layered element is due for its part to the fact that the two external layers have smooth external main surfaces and are made of materials having substantially the same refractive index, and to the fact that all the contact surfaces between two adjacent layers of the layered element, one of which is a transparent, in particular dielectric, layer and the other of which is a metal layer, or that are two transparent, in particular dielectric, layers of different refractive indices, are textured and parallel to one another.

The term "index" makes reference to optical refractive index, measured at the wavelength of 550 nm.

In the context of the invention, two transparent, in particular dielectric, materials have substantially the same refractive index, or have refractive indices that are substantially equal, when the absolute value of the difference between their refractive indices at 550 nm is lower than or equal to 0.15. Preferably, the absolute value of the difference in refractive index at 550 nm between the materials from which the two external layers of the layered element are made is lower than 0.05, and more preferably lower than 0.015. In the context of the invention, two transparent, in particular dielectric, layers have different refractive indices when the absolute value of the difference between their refractive indices at 550 nm is strictly higher than 0.15.

In the context of the invention, the following definitions are used:
A translucent or transparent element is an element through which radiation is transmitted at least in the wavelength domains useful for the targeted application of the element. By way of example, when the element is used as an automotive or architectural glazing, it is transparent at least in the visible wavelength domain.
A smooth surface is a surface for which the surface irregularities are of dimensions smaller than the wavelength of the radiation incident on the surface, so that the radiation is not deviated by these surface irregularities. The incident radiation is then transmitted and reflected specularly by the surface.
A textured surface is a surface for which the surface properties vary at a scale larger than the wavelength of the radiation incident on the surface. The incident radiation is then transmitted and reflected diffusely by the surface.

The transparent layered element allows a specular transmission and a diffuse reflection of radiation incident on the layered element on the side of either one of its external layers to be obtained. The central layer of the transparent layered element promotes the diffuse reflection, this allowing an image to be projected from either side of the transparent layered element, the image forming on the central layer.

The parallelism of the textured contact surfaces of the transparent layered element implies that, for the or each layer of the central layer that is flanked by layers of, metallic or nonmetallic, nature different from its or their own or of refractive indices different from its or their own, the thickness of the layer is uniform perpendicular to its contact surfaces with the adjacent layers. This uniformity in thickness may be global over the entire extent of the texture, or local in segments of the texture. In particular, when the texture has variations in slope, the thickness between two consecutive textured contact surfaces may change, from segment to segment, depending on the slope of the texture, the textured contact surfaces however always remaining parallel to one another. This case in particular arises with a layer deposited by cathode sputtering, in particular by cathode sputtering assisted by a magnetic field (magnetron cathode sputtering), as then the thickness of the layer decreases as the slope of the texture increases. Thus, locally, in each segment of texture having a given slope, the thickness of the layer remains constant, but the thickness of the layer differs between a first segment of texture having a first slope and a second segment of texture having a second slope different from the first slope.

Advantageously, in order to obtain the parallelism of the textured contact surfaces in the interior of the transparent layered element, the or each constituent layer of the central layer is a layer deposited by cathode sputtering. Specifically, cathode sputtering, in particular cathode sputtering assisted by a magnetic field (magnetron cathode sputtering), guarantees that the surfaces bounding the layer are parallel to each other, this not being the case for other deposition techniques such as evaporation or chemical vapor deposition (CVD), or even the sol-gel process. The parallelism of the textured contact surfaces in the interior of the layered element is essential to the obtainment of specular transmission through the element.

According to one aspect of the invention, the central layer of the transparent layered element comprises at least one thin layer made of a dielectric material of high refractive index, different from the refractive index of the external layers, such as $Si_3N_4$, $SnO_2$, $ZnO$, $AlN$, $NbO$, $NbN$, $TiO_2$, or made of a dielectric material having a low refractive index, different from the refractive index of the external layers, such as $SiO_2$, $Al_2O_3$, $MgF_2$, $AlF_3$. The central layer may also comprise at least one thin metal layer, in particular a thin layer of silver, of gold, of titanium, of niobium, of silicon, of aluminum, of nickel-chromium (NiCr) alloy, of stainless steel, or of alloys thereof. In the context of the invention, a thin layer is a layer of thickness smaller than 1 micron.

In one embodiment of the invention, one of the two external layers of the transparent layered element is a textured external layer comprising a flexible or rigid substrate, in particular made of glass or of polymeric organic material, a main surface of which is textured.

In one embodiment of the invention, the first scattering element comprises a textured substrate comprising a flexible or rigid substrate, in particular made of glass or of polymeric organic material, a main surface of which is textured.

One of the main surfaces of the substrate may be textured by any known texturing process, for example by embossing the surface of the substrate heated beforehand to a temperature at which it is possible to deform it, in particular by rolling by means of a roller having on its surface a complementary texture to the texture to be formed on the substrate, or even by 3D printing, preferably on the basis of a texture generated computationally.

In the case of a textured external layer or of a textured substrate formed by a textured substrate made of mineral glass, the glass is preferably soda-lime-silica glass, but, according to variants, it may be borosilicate glass, alumino-borosilicate glass, etc.

In the case of a textured external layer or of a textured substrate formed by a textured substrate made of polymeric organic material, examples of suitable materials comprise, in particular, polyesters such as polyethylene terephthalate (PET), polybutylene terephthalate (PBT) and polyethylene naphthalate (PEN); polyacrylates such as polymethyl methacrylate (PMMA); polycarbonates; polyurethanes; polyamides; polyimides; fluoropolymers such as ethylene tetrafluoroethylene (ETFE), polyvinylidene fluoride (PVDF), polychlorotrifluoroethylene (PCTFE), ethylene chlorotrifluoroethylene (ECTFE) and fluorinated ethylene-propylene copolymers (FEP); photocurable and/or photopolymerizable resins, such as thiol-ene, polyurethane, urethane-acrylate, polyester-acrylate resins; and polythiourethanes. These polymers in general have a refractive index range at 550 nm extending from 1.30 to 1.70. However, it is interesting to note that certain of these polymers, and in particular the sulfur-containing polymers such as the polythiourethanes, may have refractive indices at 550 nm that are high and possibly of as high as 1.74.

In another embodiment of the invention, the textured substrate or one of the two external layers of the transparent layered element is a textured external layer formed by a formable layer, a main surface of which is textured and that is added, via its other main surface, to a flexible or rigid substrate. It may in particular be a question of a thermoformable layer or of a layer made of photocurable and/or photopolymerizable material. In this case, one process very suitable for texturing one of the main surfaces of the formable layer is, in particular, embossing. Preferably, the photocurable and/or photopolymerizable material is a liquid at room temperature and yields, when it has been irradiated and photocured and/or photopolymerized, a transparent solid devoid of bubbles or any other irregularity. It may in particular be a question of a resin such as those commonly used as adhesives, glues or surface coatings. These resins are generally based on monomers/comonomers/prepolymers of epoxy, epoxysilane, acrylate, methacrylate, acrylic-acid or methacrylic-acid type. Mention may be made, by way of example, of thiol-ene, polyurethane, urethane-acrylate and polyester-acrylate resins. Instead of a resin, it may be a question of a photocurable aqueous gel, such as a polyacrylamide gel.

When one of the two external layers of the transparent layered element is a textured external layer, one main surface of which is textured and the other main surface of which is smooth, the central layer is advantageously formed:
  either by a single layer made of metallic material or made of transparent, in particular dielectric, material of refractive index different from that of the textured external layer, which layer is deposited conformally on the textured main surface of the textured external layer,
  or by a stack of layers, which comprises at least one layer made of metallic material or made of transparent, in particular dielectric, material of refractive index different from that of the textured external layer, which layers are deposited in succession conformally on the textured main surface of the textured external layer.

According to the invention, the deposition of the central layer, or the successive deposition of the layers of the central layer, on the textured main surface of the textured external layer is considered to be carried out conformally if, following the deposition, the surface of the or each layer of the central layer is textured and parallel to the textured main surface of the textured external layer. According to one advantageous feature, the conformal deposition of the central layer, or the successive conformal deposition of the layers of the central layer, on the textured main surface of the textured external layer, is achieved by cathode sputtering, in particular cathode sputtering assisted by a magnetic field (magnetron cathode sputtering). Other conformal deposition techniques such as evaporation techniques are also envisionable, in particular for deposition of metal layers.

According to one aspect of the invention, the other external layer of the transparent layered element, i.e. the external layer located on the other side of the central layer with respect to the textured external layer, comprises a layer of settable material of refractive index substantially equal to that of the textured external layer, deposited on the textured main surface of the central layer opposite to the textured external layer while initially in a viscous, liquid or pasty state suitable for forming operations.

The deposited layer initially in a viscous, liquid or pasty state may in particular be a layer for planarizing the surface of the transparent layered element. As a variant, the deposited layer initially in a viscous, liquid or pasty state may be a layer that ensures bonding between, on the one hand, the textured external layer equipped with the central layer and, on the other hand, a counter-substrate.

The deposited layer initially in a viscous, liquid or pasty state may be a layer of photocurable and/or photopolymerizable material. Preferably, this photocurable and/or photopolymerizable material is a liquid at room temperature and yields, when it has been irradiated and photocured and/or photopolymerized, a transparent solid devoid of bubbles or any other irregularity. It may in particular be a question of a resin such as those commonly used as adhesives, glues or surface coatings. These resins are generally based on monomers/comonomers/prepolymers of epoxy, epoxysilane, acrylate, methacrylate, acrylic-acid or methacrylic-acid type. Mention may be made, by way of example, of thiol-ene, polyurethane, urethane-acrylate and polyester-acrylate resins. Instead of a resin, it may be a question of a photocurable aqueous gel, such as a polyacrylamide gel.

As a variant, the deposited layer initially in a viscous, liquid or pasty state may be a layer deposited by a sol-gel process, in particular a sol-gel layer comprising a hybrid organic/inorganic silica-based matrix. Such a sol-gel layer is particularly advantageous because it is possible to adjust with precision the value of its refractive index, so as to make it match as closely as possible that of the textured external layer. According to the invention, the index difference between the two external layers of the transparent layered element corresponds to the absolute value of the difference between the refractive indices at 550 nm of the dielectric materials from which they are made. The smaller the refractive index difference, the clearer the vision through the layered element. In particular, excellent vision is obtained with an index difference smaller than or equal to 0.050, preferably smaller than or equal to 0.030 and better still smaller than or equal to 0.015.

According to one aspect of the invention, at least one of the two external layers of the transparent layered element is an interlayer sheet based on polymer, in particular thermoformable or pressure-sensitive polymer, i.e. the type of sheet that is used as interlayer in laminated glazings. It may be a question, in particular, of at least one sheet based on polyvinyl butyral (PVB), ethylene vinyl acetate (EVA), polyurethane (PU), polyethylene terephthalate (PET) or polyvinyl chloride (PVC). This layer based on polymer may play the role of a lamination interlayer that may be laminated or calender-rolled onto a substrate by way of additional layer, for example a clear or extra-clear glass substrate.

According to one aspect of the invention, the transparent layered element may be a flexible film in particular a laminated textured film. Such a flexible film is advantageously equipped, on one of its external main surfaces, with an adhesive layer covered with a protective strip intended to be removed for the adhesive bonding of the film. The layered element in the form of a flexible film is then able to be added by adhesive bonding to an existing surface, for example a surface of a transparent article, in order to give this surface diffuse reflection properties, while maintaining the property of specular transmission through the glazing. The article to which the transparent layered element in the form of a flexible film is added may be a planar or curved glazing.

In one embodiment, the article furthermore comprises at least one additional layer positioned against the transparent layered element, preferably chosen from:

transparent substrates chosen from polymers, glasses or ceramics comprising two smooth main surfaces, settable materials initially in a viscous, liquid or pasty state suitable for forming operations, in particular a sol-gel layer, polymer-based interlayer sheets, in particular thermoformable or pressure-sensitive interlayer sheets.

A layered element according to the invention for example comprises an external layer based on a transparent textured substrate such as an acid-etched satin glass. The central layer is formed either by a single layer deposited conformally on the textured main surface of the first external layer, or by a stack of layers, deposited in succession conformally on the textured main surface of the first external layer. In this embodiment, the central layer is deposited on an external layer comprising an already textured or pre-textured substrate. Preferably, the central layer is deposited by cathode sputtering, in particular magnetron cathode sputtering. The other external layer comprises:

a layer based on settable materials initially in a viscous, liquid or pasty state suitable for forming operations, or a sheet made of thermoformable or pressure-sensitive plastic material.

The smooth external main surfaces of the transparent layered element may be planar or curved. The smooth external main surfaces of the layered element are preferably parallel to each other, this contributing to limiting the dispersion of light for radiation passing through the layered element.

Figure 1B:
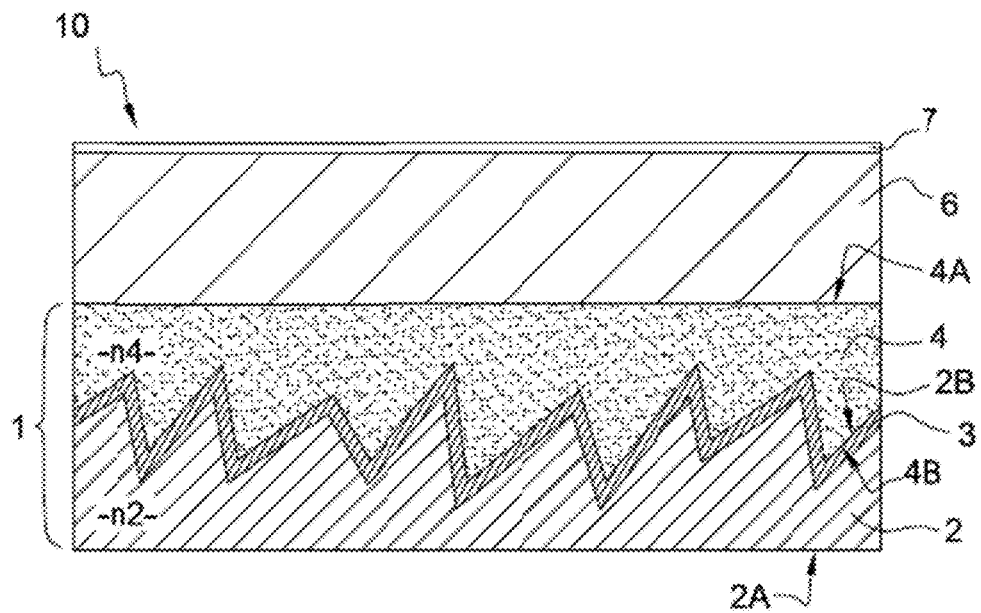

The features and advantages of the invention will become apparent from the following description of a plurality of article embodiments according to the invention, which description is given merely by way of example and with reference to the appended FIGS. 1A and 1B, which are schematic cross sections of a front-projection system comprising a projector and an article according to the invention.

For the clarity of the drawing, the relative thicknesses of the various layers have not been rigorously respected. In addition, when the first element is a textured substrate or a layered element, the possible variation in the thickness of the central layer depending on the slope of the texture has not been shown in the figures, it being understood that this possible variation in thickness has no impact on the parallelism of the textured contact surfaces. Specifically, for each given slope of the texture, the textured contact surfaces are parallel to one another. Moreover, it will be noted that the contact surfaces are shown only schematically, it being understood that their texture meets the slope-distribution criterion of the invention.

Figure 2A:
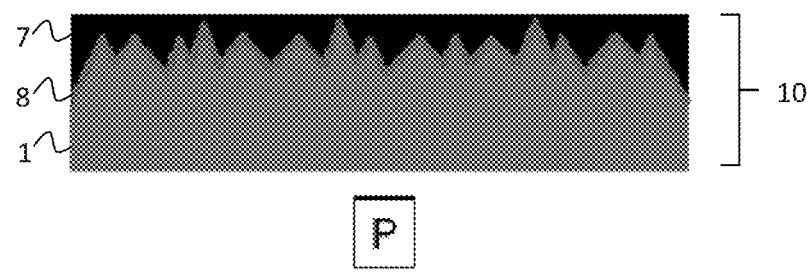

FIGS. 1A and 2A are schematic cross sections of a front-projection system, comprising a projector P and an article 10 comprising:

a first scattering element 1 comprising a textured substrate such as a rough glass substrate, optionally a thin layer 8 having a textured surface, a second scattering element comprising a scattering coating 7.

Figure 2B:
Figure 2B:
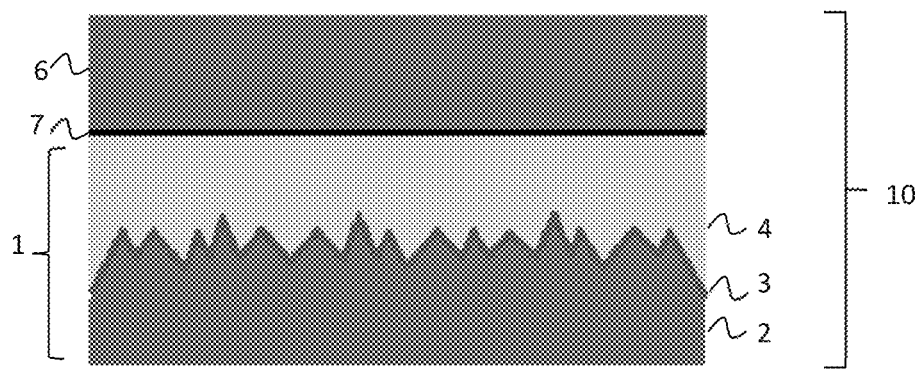
Figure 2B:

FIGS. 1B and 2B are schematic cross sections of a front-projection system, comprising a projector P and an article 10 comprising:
- a first scattering element comprising a layered element 1,
- a second scattering element comprising a scattering coating 7 deposited on an additional substrate 6.

The layered element 1 comprises two external layers 2 and 4 that are made of transparent dielectric materials having substantially the same refractive index n2, n4. Each external layer 2 or 4 has a smooth main surface, 2A or 4A, respectively, that is directed toward the exterior of the layered element, and a textured main surface, 2B or 4B, respectively, that is directed toward the interior of the layered element.

The textures of the internal surfaces 2B and 4B are complementary to each other. The textured surfaces 2B and 4B are positioned facing each other, in a configuration in which their textures are strictly parallel to each other. The layered element 1 also comprises an intermediate central layer 3, in contact between the textured surfaces 2B and 4B.

When the central layer 3 is a thin layer or a stack of thin layers, the thickness of each layer of the central layer 3 is about, or smaller than, 1/10 of the average height of the features of each textured contact surface of the layered element.

In an example article 10 shown in FIG. 1B, the first external layer 2 is a textured substrate made of extra-clear or clear glass, and the second external layer 4 is formed by an interlayer sheet, for example made of PVB, that has substantially the same refractive index as the substrate 2 and that conforms to the texture of the textured surface of the central layer 3. The interlayer sheet 4 is calender rolled via its external surface 4A to a planar substrate 6 made of extra-clear or clear glass, for example a glass such as SGG Planilux sold by Saint-Gobain Glass, which forms additional layers.

According to another embodiment, the first external layer 2 is not a textured glass, but an interlayer sheet, for example made of PVB, that has substantially the same refractive index as the interlayer sheet 4. In this second example, the central layer 3 comprises a flexible film, for example a film of polymethyl methacrylate (PMMA) having a thickness of about 50 to 250 µm, on which a thin layer made of dielectric or metal has been deposited, for example a thin layer of $TiO_2$ having a thickness of about 50 to 75 nm. The assembly consisting of the flexible film and the thin layer is given an undulatory or accordion shape in order to create the textured central layer 3, which is then sandwiched between the interlayer sheets 2 and 4, such that the contact surfaces between the layers 2, 3 and 4 remain parallel to each other. Each of the interlayer sheets 2, 4 may be calender rolled via its external surface 2A, 4A to a planar substrate 5 (not shown) or 6 made of extra-clear or clear glass, for example a glass such as SGG Planilux sold by Saint-Gobain Glass, which form additional layers.

The texture according to the invention of each textured contact surface $S_0, S_1, \ldots, S_k$, is advantageously obtained by texturing a main surface of a first external layer among the two external layers 2 and 4, in particular by embossing or 3D printing, preferably on the basis of a texture generated computationally, and depositing the central layer 3 conformally on the textured main surface of the first external layer. The central layer 3 is considered to have been deposited conformally on the textured main surface of the first external layer if, following the deposition, the upper surface of the central layer 3 is textured and parallel to the textured main surface of the first external layer. The conformal deposition of the central layer 3, or the conformal deposition of the constituent layers of the stack of the central layer 3, on the textured main surface of the first external layer is preferably carried out by cathode sputtering, and in particular by magnetron cathode sputtering. The thin layer 8 of FIG. 1A may correspond to a central layer 3.

The second external layer among the two external layers 2 and 4 may be formed by depositing, on the textured main surface of the central layer 3 opposite to the first external layer, a layer that has substantially the same refractive index as the first external layer and that is initially in a viscous state suitable for forming operations. The second external layer may thus be formed, for example, by a process comprising depositing a layer of photocurable and/or photopolymerizable material initially in fluid form then irradiating this layer, or by a sol-gel process. As a variant, the second external layer may be formed by positioning, against the textured main surface of the central layer 3 opposite to the first external layer, a polymer-based layer having substantially the same refractive index as the first external layer, then conforming this polymer-based layer against the textured main surface of the central layer 3 by compression and/or heating at least to the glass-transition temperature of the polymer.

EXAMPLES

The light transmission TL and light reflection RL in the visible in % are measured according to standard ISO 9050: 2003 (illuminant D65; 2° observer) with radiation at normal incidence.

I. Materials Used

1. First Scattering Element: Layered Element

These trials were carried out with layered elements such as defined in table 1.

TABLE 1

|  | Layered element 1 | Layered element 2 | Layered element 3 |
|---|---|---|---|
| Materials |  |  |  |
| First external layer | Satin glass 1 | Satin glass 2 | Satin glass 1 |
| Central layer | Layer of TiO2 | Layer of TiO2 | Layer of TiO2 |
| Second external layer | PVB sheet | PVB sheet | EVA sheet |
| Texture |  |  |  |
| Rdq ° Scattering in reflection | 5.6 | 17.5 | 5.6 |
| The maximum normalized gain | 8.8 | 1.4 | 8.8 |
| DRDM* | 0° | 0° | 0° |
| Angle of measurement of luminance in the DRDM** | 3° | 3° | 3° |
| Viewing angle | 125° | >130° | 125° |

*Direction of maximum diffuse reflection with respect to the normal to the screen
**With respect to the direction of maximum diffuse reflection The satin glasses correspond to textured glass substrates also qualified satin substrates of transparent rough glass. These textured substrates of 4 mm thickness comprise a textured main surface obtained by acid etching.

The central layers are layers of titanium oxide of 60 nm deposited by magnetron cathode sputtering ("magnetron deposition") so as to conform to the textured surface of the textured substrates.

The first scattering elements used in these examples are all scattering elements the diffuse reflection of which is nonuniform and that have a privileged scattering direction in the specular direction, i.e. an angle of maximum scattering corresponding to the specular direction. Therefore, the maximum luminance is in each case measured at an angle of 3° with respect to the direction of specular reflection corresponding to the privileged scattering direction excluding the specular.

2. Second Scattering Element: Black Scattering Coating

The black or dark-colored scattering coating consists of a black lacquer. This black coating is an opaque and absorbent coating. It is deposited on a planar SGG PLANICLEAR® glass substrate of 4 mm thickness. The lacquer and substrate together form a sheet of the black lacquered glass sold by Saint-Gobain under the trade name Planilaque®.

This black coating has the following properties:
a light transmission TL lower than 5%,
a light reflection RL of about 5%,
$L^*$ about equal to 27, and $a^*$, $b^*$ are comprised between 0 and −1, measured in reflection on the side of the substrate opposite to the side on which the coating has been deposited.

3. Articles

The articles according to the invention are obtained by laminating the layered elements with a black lacquered glass. The second external layer made of PVB or EVA of the layered element is used as lamination interlayer allowing the lacquered glass and the layered element to be assembled.

For the examples Inv.1 and Inv.2, the black or dark-colored scattering coating formed by the lacquer is located on the face of the substrate not in contact with the plastic sheet made of PVB.

In the case of a lamination scattering-coating side, a plastic sheet made of EVA or a plastic sheet made of PVB associated with a tie layer is preferably used for reasons of mechanical strength. For the examples Inv.3, Inv.4 and Inv.5, the black or dark-colored coating formed by the lacquer is located on the face of the substrate in contact with the PVB or EVA sheet.

| Article*: | Comp. 1 | Comp. 2 | Inv. 1 | Inv. 2 |
|---|---|---|---|---|
| Layered element | No | 1 | 1 | 2 |
| Glass substrate | Yes | Yes | Yes | Yes |
| Black coating | Yes | No | Yes | Yes |

| Article*: | Inv. 3 | Inv. 4 | Inv. 5 |
|---|---|---|---|
| Layered element | 1 | 1 | 3 |
| Tie layer | — | Yes | — |
| Black coating | Yes | Yes | Yes |
| Glass substrate | Yes | Yes | Yes |

*The various elements are positioned in the article in the order indicated in the above tables. For example, for the article Inv. 1, the layered element makes direct contact with a glass substrate that itself makes direct contact with a black coating.

II. Visual Assessment and Optical Properties

FIG. 3 corresponds to photographs of the comparative article 1 and of the article according to the invention being used as front-projection screen.

The measurement of the 350 Lux is carried out with a light meter placed in front of the screen facing the turned-off video projector. The main plane of the screen (plane of the image) is vertical. Only ceiling lights are used. There is no source of direct lighting directed toward the surface of the screen.

The brightness of the image projected onto the article according to the invention and its contrast (Inv.1, photograph 3D) are highly improved with respect to an image projected onto a black lacquered glass alone (Comp.1; photograph 3G).

Visual observations in order to compare the intensity of the black side of the layered element were carried out. A score of 1 to 3 was attributed with "1" qualifying the least intense black and "3" the most intense black.

|  | Example | | |
|---|---|---|---|
|  | Comp. 1 | Inv. 1 | Inv. 2 |
|  | FIG. | | |
| Visual assessment | 3G | 3D | — |
| Intensity of the black | | | |
| Face-on, 350 LUX | 3 | 1 | 1 |
| At 45°, 350 LUX | 3 | 2 | 1 |
| Face-on, 0.5 LUX | 3 | 3 | 3 |
| At 45°, 0.5 LUX | 3 | 3 | 3 |
| Metallic appearance | No | Yes | Yes |

The transmitted rays are mainly absorbed by the black lacquer. However, in projection, a not very bright ghost may be visible but only at large angles of observation, between 75° and grazing angles. Thus, this effect is not discomforting for the spectator.

In addition, it is possible to decrease the severity of this effect by placing the black or dark-colored scattering coating closer to the scattering texture. To this end, article Inv.3 differs from Inv.1 in that the lacquered glass is laminated not on the glass side but on the lacquer side. In this variant, and in variants Inv. 4 and Inv. 5, the lacquer is located in the interior of the article right next to the scattering texture. Therefore, ghost images are minimized and become almost invisible under the usual conditions of observation of a screen.

From an aesthetic point of view without protection, the visual appearance of the article is partially modified with respect to the visual appearance of a black or dark-colored coating not superposed on a layered element When direct illumination of the article is limited or indeed if the light scattered by the texture is not scattered in the direction of the observer, then the article appears of color close to that of the black or dark-colored coating, in particular dark black in the case of black Planilaque® sheets.

When a bright light illuminates the surface of the screen, the latter appears dark grey with a metallic appearance or metallic effect. All of these properties endow the article with a look that may be likened to the effects developed for the paints of motor-vehicle bodywork.

III. Properties of the Screen

1. Analysis of the Contrast

Contrast measurements were carried out in order to test the front-projection screens of the invention. These measurements were carried out with artificial lighting the average illuminance of which was 350 lux. Contrast is defined as the ratio of the luminance measured when the projector is displaying a white image (white luminance w. l.) to the luminance measured when the projector is displaying a black image (black luminance, b. l.).

The table below gives the luminance and contrast measurements for black lacquered glasses alone (Comp. 1), for diffusely reflecting transparent elements alone (Comp. 2) and for the article Inv.1.

| Article | Measurement angle | LUX | w.l. | b.l. | Contrast | Observations |
|---------|------|-----|------|------|----------|--------------|
| Comp. 1 | 3°   | 350 | 21.3 | 2.5  | 8.5   | w.l. too low |
| Comp. 2 | 3°   | 350 | 1440 | 11   | 137   | b.l. too high |
| Inv. 1  | 3°   | 350 | 1380 | 7.7  | 179   | w.l. and b.l.: ok |
| Comp. 1 | 45°  | 350 | 16.2 | 0.63 | 25.7  | w.l. too low |
| Comp. 2 | 45°  | 350 | 41   | 4.7  | 8.7   | b.l. too high |
| Inv. 1  | 45°  | 350 | 42   | 1.7  | 24.7  | w.l. and b.l.: ok |

Two characteristics must be present for the quality of the projected images to be good in terms of brightness, a white luminance, in the privileged scattering direction, higher than 50 cd/m$^2$ and a high contrast.

The invention allows projected images of very good contrast to be obtained, in particular when it is used in an illuminated environment (daylight and/or artificial light). The white luminance is very high whereas the black luminance remains low. In comparison, a white Planilaque® sheet under illumination of 350 LUX has a white luminance of 1300 cd/m$^2$ and a black luminance of about 55 cd/m$^2$ at 0°. The article according to the invention has a white luminance comparable to that obtained with a white lacquered glass of Planilaque® type and a black luminance seven times lower.

Observed at 45 degrees, the contrast is of the same order of magnitude for the article according to the invention and for black lacquered glasses alone, with a dark black and a white luminance close to 50 cd/m$^2$. Such a contrast is sufficient for information to be easily read.

2. Viewing Angle

The viewing angle corresponds to the angle at which the contrast reaches 4.5:1, which is the minimum contrast required to comfortably read information. Concretely, when the angle of observation increases, the brightness of the image decreases. The article Inv.1 has a screen viewing angle of 125° (±62.5°/normal to the screen).

3. Normalized Gain of the Screen

The variation in normalized gain depending on angle of observation is calculated in the following way:

in absolute value (AV): $\Delta G = |G_3° - G_{45}°|$
in percentage (P): $\Delta G = |G_3° - G_{45}°|/G_3° *100$
with $G_3°$ and $G_{45}°$ the gain at 3° and 45°, respectively.

|       | Gain at 3° | Gain at 45° | ΔG | Uniform diffuse reflection |
|-------|-----------|-------------|-----|----------------------------|
| Comp1 | 0.12      | 0.10        | AV: 0.02 | Yes |
| Comp2 | 9.1       | 0.2         | AV: 8.9  P: 98% | No |
| Inv1  | 8.8       | 0.3         | AV: 8.5  P: 97% | No |

The gain of the article Inv.1 is 8.8 and the gain of Inv.2 is 1.4.

A gain higher than 1 at 0° means an increased brightness at small angles of observation. A high gain level, such as that measured for article Inv.1, allows the article to be used as a screen in an illuminated environment while preserving a good image quality, the images appearing bright and contrasted.

IV. Visibility of Marks

The visibility of finger marks on the surface of a material or article was measured using the following protocol.

The mark was deposited on the surface to be measured with a device comprising a rubberstamp and the pattern to be transferred was a fingerprint. An artificial sebum solution (body fat+aqueous solution) supplied for example by Essilor® was deposited on the stamp.

The application of the sebum to the stamp then the transfer of the print were carried out using a rigorous protocol so as to obtain a maximum repeatability and a completely identical mark.

The surface with or without print was illuminated with a strip light of white LEDs (directional lighting). A camera filmed the scene from normal to the surface to be measured. The relative positions of the "surface to be measured"/"light"/"camera" remained the same.

Visibility was quantified in the following way:
Acquisition of an image of the surface without print,
Transfer of the print,
Acquisition of an image of the same surface with print,
Extraction of the outline of the print,
Measurement of the brightness L1 in the extracted area,
Extraction of the same zone in the image without mark and measurement of the luminosity L0,
Expression for the contrast=mark visibility %=100×(L1−L0)/(L1+L0).

A finger mark is transferred to the surface to be evaluated. Images are then taken and analyzed in order to evaluate the visibility of the finger marks. A contrast value is then determined. A high contrast corresponds to a high visibility.

The contrast measured on a finger mark is 9 times lower with the article Inv. 1 (contrast=5) then with the article Comp. 1 corresponding to the black lacquered substrate alone (contrast of 45). The article according to the invention indeed allows the visibility of finger marks to be considerably decreased.

V. Other functionalities

The photographs in FIGS. 4B, 4C and 4D illustrate the "blackboard" functionality that can be combined with the projection-screen functionality:
Figure B: kitchen worktop,
Figure C: school marker boards,
Figure D: meeting room.

The article renders colors very well and has a good resolution. The resolution is mainly related to the properties of the texture used and in particular to the typical period of the "grains" at this texture (RSm=132 µm+/−50 µm).

VI. Conclusion

The article according to the invention indeed has the following advantages:
the white luminance of projected images is sufficiently high to allow a good contrast and therefore a good viewing quality to be obtained whatever the level of illumination of the room,
the brightness, contrast (180:1) and resolution of the image allow an excellent readability of projected information,
the high gain allows bright images to be obtained including in an illuminated environment,
viewing angle remains compatible with a high number of existing projection situations,
the rendering of colors is very good,
the visibility of smudges is decreased.

The black or dark-colored article according to the invention used as a front-projection screen allows image projection to be combined with use as a marker board.

The invention claimed is:

1. An article used as front-projection screen comprising first and second scattering elements, which are two distinct diffusely reflecting scattering elements, taking the form of parallel sheets or planes, wherein:

the first scattering element is translucent or transparent and comprises at least one textured surface and is chosen from a textured substrate or a specularly transmitting and diffusely reflecting transparent layered element comprising:

two transparent external layers having substantially the same refractive index and each having a smooth external main surface, and a central layer intermediate between the external layers, the central layer comprising at least one transparent layer of refractive index different from that of the external layers or a metal layer, all contact surfaces between two adjacent layers of the layered element, one of the two adjacent layers being a metal layer or the two adjacent layers being two transparent layers of different refractive indices, being textured and parallel to one another, a root-mean-square slope Rdq of the profile of the textured surface is strictly higher than 0.2°, and the second scattering element is of dark color.

2. The article as claimed in claim 1, wherein the article has a black luminance lower than 30 cd/m² measured in an environment illuminated to 350 LUX in the privileged scattering direction, the specular being excluded, on the side of the first scattering element.

3. The article as claimed in claim 1, wherein the article has a white luminance higher than 100 cd/m² measured in an environment illuminated to 350 LUX in the privileged scattering direction, the specular being excluded, on the side of the first scattering element.

4. The article as claimed in claim 1, wherein the second scattering element has a uniform diffuse reflection.

5. The article as claimed in claim 1, wherein the first scattering element has a nonuniform diffuse reflection.

6. The article as claimed in claim 5, wherein the diffuse luminous reflection of the article, measured on the side of the first scattering element, has at least one maximum in a direction distinct from the direction of specular reflection.

7. The article as claimed in claim 1, wherein the article has maximum variations in normalized gain as a function of angle of observation, measured on the side of the first scattering element, between 0° and 60° with respect to the normal to the screen, that are:

in absolute value, larger than 0.2, and in percent, larger than 30%.

8. The article as claimed in claim 1, wherein an external layer of the layered element is formed by a textured substrate chosen from polymers, glasses or ceramics comprising at least one textured surface.

9. The article as claimed in claim 1, wherein the central layer of the layered element is obtained by depositing, by cathode sputtering, a single layer or a stack of layers.

10. The article as claimed in claim 1, wherein the second scattering element is a scattering coating.

11. The article as claimed in claim 10, wherein the scattering coating is an opaque and absorbent coating chosen from mineral or organic paints and enamels.

12. The article as claimed in claim 10, wherein the scattering coating is deposited on an additional substrate, and the additional substrate and the first scattering element are securely fastened by lamination using a sheet made of plastic material.

13. The article as claimed in claim 12, wherein the sheet made of plastic material is an external layer of the layered element.

14. The article as claimed in claim 10, wherein the scattering coating is deposited on the face of the additional substrate that is:

furthest from the transparent layered element or closest to the transparent layered element.

15. A front-projection system comprising an article used as front-projection screen as claimed in claim 1 and a projector, the article comprising a front face onto which is projected the image and a back face wherein the second scattering element is separated from the front face at least by the first scattering element.

16. A reflective front-projection method wherein a front-projection screen operating in reflection and a projector are provided, said method comprising projecting by virtue of the projector images onto the front-projection screen, said front-projection screen comprising an article as claimed in claim 1.

17. The article as claimed in claim 1, wherein the root-mean-square slope Rdq of the profile of the textured surface is between 0.5° and 40°.

18. The article as claimed in claim 1, wherein the root-mean-square slope Rdq of the profile of the textured surface is between 1.0° and 30°.

* * * * *